United States Patent
Wagner

[19]

[11] Patent Number: 5,949,365

[45] Date of Patent: Sep. 7, 1999

[54] MULTIPLE-BEAM RADAR SYSTEM

[75] Inventor: Klaus-Peter Wagner, Stuttgart, Germany

[73] Assignee: Robert Bosch GmbH, Stuttgart, Germany

[21] Appl. No.: 09/055,788

[22] Filed: Apr. 6, 1998

[30] Foreign Application Priority Data

Apr. 9, 1997 [DE] Germany ............................ 197 14 570

[51] Int. Cl.[6] ...................................................... G01S 13/93
[52] U.S. Cl. .............................................................. 342/70
[58] Field of Search .................................. 342/70, 71, 72, 342/94, 147, 153, 154, 158, 175; 340/901, 902, 903, 904; 180/167; 701/70, 301

[56] References Cited

U.S. PATENT DOCUMENTS 4,308,536  12/1981  Sims, Jr. et al. .
4,757,450   7/1988  Etoh ........................................... 342/70
5,132,690   7/1992  Martin ...................................... 342/158

FOREIGN PATENT DOCUMENTS 0 568 427   11/1993  European Pat. Off. .
195 43 813   5/1997  Germany .
WO 97/02496  1/1997  WIPO .

*Primary Examiner*—Daniel T. Pihulic
*Attorney, Agent, or Firm*—Kenyon & Kenyon

[57] ABSTRACT

A multiple-beam radar system, in particular for motor vehicle applications. More transmission elements than reception elements are present. The transmission elements present can be activated both individually and also in any desired simultaneous combination. An observable angular region can thereby be widened, in economical fashion, as compared with known radar systems.

12 Claims, 3 Drawing Sheets

MULTIPLE-BEAM RADAR SYSTEM

FIELD OF THE INVENTION

The present invention relates to a multiple-beam radar system for recovering and analyzing angular data about detected radar targets. It relates in particular to a radar system for a motor vehicle so that, in the context of an automatic clearance warning or clearance control system, vehicles traveling ahead can be allocated to individual travel lanes on the basis of the angular datum obtained.

BACKGROUND INFORMATION

A radar system is known, for example, from International Patent Publication No. WO 97/02496. The radar system according to this document has three combined transmission/reception elements which, in conjunction with a shared antenna lens, form three transmission and reception lobes. Reflected radar signals which are received via these three reception lobes are first processed in three parallel signal paths. On the basis of an amplitude analysis, an angular position of all detected objects can be calculated.

For future, expanded applications of such radar systems, for example in traffic jams or in city traffic, there is now a requirement that the observable angular region be widened, especially in the close-in range of the radar system.

Difficulties arise in this connection in that the received radar signals are generally very weak, and accordingly, in order to eliminate unnecessary additional damping, must be prepared and processed as immediately as possible after they are received. In this context, it is advantageous to provide first amplifier stages and/or mixer stages in each reception path so as thereby to eliminate, to the extent possible, signal-damping high-frequency switchers or multiplexers. The result of this, however, is that when the observable angular region is enlarged by expanding the transmission/reception concept known from the aforementioned document—i.e. by adding further transmission/reception elements—the circuit complexity on the reception side, and therefore a substantial cost factor, increases sharply. A simple widening of the individual transmission/reception lobes used hitherto would, on the other hand, degrade the angular resolution hitherto obtained.

An anti-collision motor vehicle radar which possesses two transmission antennas and only one reception antenna is known from U.S. Pat. No. 4,308,536. The two transmission antennas possess antenna lobes which each occupy an angle of 3 degrees with respect to the longitudinal axis of the motor vehicle. The width of each lobe is 10 degrees. The principal beam direction of the reception antenna is aligned along the longitudinal axis of the motor vehicle. The output pulses of a transmitter are switched over alternately, by means of a switch, to the two transmission antennas. The observable angular region in this case is 16 degrees. This is too small in terms of the desired future applications. With this principle, known generally as "sequential lobing," a widening of the observable angular region has a disadvantageous effect on the accuracy of the angular measurement.

A radar system of the species which possesses four individually activatable transmission elements and six simultaneously utilized reception elements is known from European Patent No. EP 568 427 A1. In this system as well, the observable angular region is 16 degrees, which, as already mentioned, is too small for future applications

SUMMARY OF THE INVENTION

An object of the present invention is to provide a multiple-beam radar system, for determination of an angular datum of detected radar targets, in which the observable angular region is widened, economically and with approximately the same angular resolution, as compared with known systems.

According to the present invention this object is achieved in that more transmission elements than reception elements are present; and that the transmission elements present can be activated both individually and in any desired simultaneous combination.

Because of the feature that more transmission elements than reception elements are present, the angular region that can be illuminated, and consequently can theoretically be observed, is widened in economical fashion. In combination with the second feature, namely that the transmission elements which are present can be activated both individually and also in any desired simultaneous combination, the result, as explained more precisely below, is the possibility of analyzing this widened illuminated angular region with the required accuracy even without further reception elements.

By means of the transmission elements present additionally as compared with known radar systems, the expanded angular region to be observed can be illuminated in specific fashion. Reception of reflected radar targets is accomplished, as before, by means of the known reception elements which are already present. In this context, the secondary lobes of the reception elements can also optionally be utilized.

A substantial advantage of the radar system according to the present invention is that an observable angular region which is widened as compared with known radar systems is achieved without the addition of further reception paths; accordingly, no further, cost-intensive received signal paths are required. In addition, the expanded angular region can be easily and flexibly adjusted and modified. Because of this property, the radar system can advantageously be adapted to different measurement tasks. If a wider observable angular region is required, for example in a traffic jam, a wide radiation characteristic can be generated by using all the transmission elements that are present. If, on the other hand, for fast travel on a highway, only a narrow observable angular region is required, then transmission occurs, for example, via only one or two transmission elements. A further advantage of the radar system according to the present invention is that the actual angular analysis can take place substantially according to the methods already applied previously, for example as mentioned in International Patent Publication No. WO 97/02496, on the basis of an amplitude comparison. Accordingly, only slight additions or modifications to a known signal processing algorithm are necessary. A further substantial advantage of the present invention is that signal-damping switchers between various reception paths can be dispensed with. As a result of this, it is possible to work with a lower transmitting power by comparison with radar systems which have such switchers. This is in turn very advantageous, in particular, in terms of requirements for and problems with electromagnetic compatibility (EMC).

DETAILED DESCRIPTION

Figure 1:
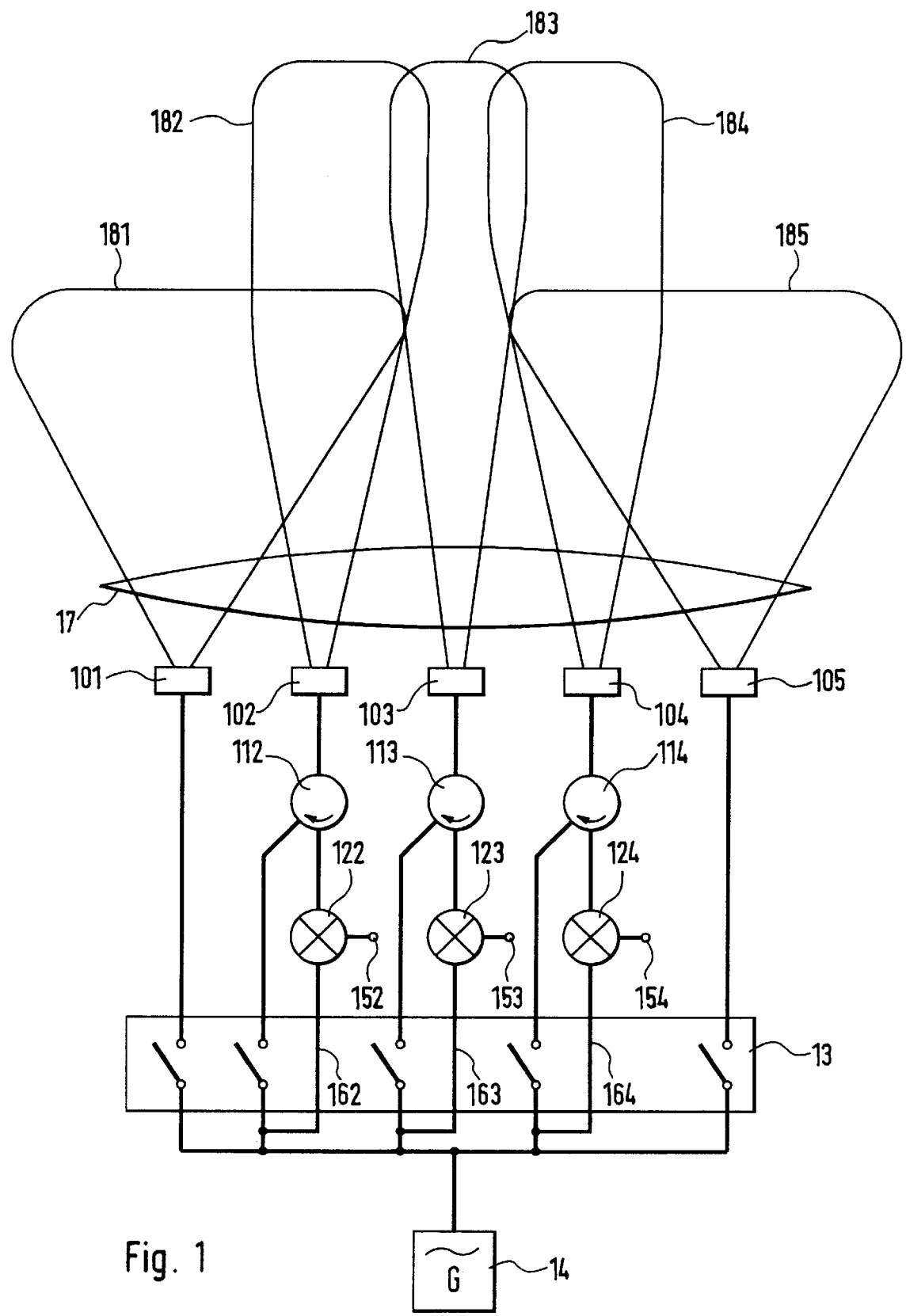
FIG. 1 shows a schematic depiction of the construction of a radar system according to the present invention.

FIG. 1 shows a radar system according to the present invention in a schematic depiction. Arranged below a dielectric lens 17, which serves as a focusing element, are arranged—taken as an example—five antenna elements 101, 102, 103, 104, and 105. According to a preferred embodiment, these are embodied as patch antenna elements. They can, however, also be implemented differently, for example as horn radiators. Antenna elements 101 and 105 operate purely as transmission elements. They are each connected by means of a switch, for example a PIN diode switch, to a switch arrangement 13 with an oscillator 14. The latter generates high-frequency signals which on the one hand serve as transmission elements and, according to a preferred embodiment of the present invention, are also used to mix down the received signals. Antenna elements 102, 103, and 104 are combined transmission and reception elements. Antenna elements 101, 102, 103, 104, and 105 are arranged spatially with respect to one another in such a way that the totality of reception elements 102, 103, and 104 of this arrangement is arranged centeredly with respect to the totality of the transmission elements, i.e., in this case, centeredly with respect to the totality of all antenna elements.

The combined transmission and reception elements 102, 103, and 104 are connected to respective transmission-reception splitters 112, 113, and 114. Transmission-reception splitters 112, 113, and 114 are preferably configured as rat-race rings, but alternatively can also, for example, represent a circulator. The high-frequency signals of oscillator 14 are each delivered, via a respective switch of switch arrangement 13, to an input of transmission-reception splitters 112, 113, and 114. All the transmission elements can thus be activated, both individually and in any desired simultaneous combination, by means of the individual switches of switching arrangement 13. At a further terminal, transmission-reception splitters 112, 113, and 114 are each connected to a mixer 122, 123, and 124.

According to a preferred embodiment of the present invention, the high-frequency signals of oscillator 14 are delivered via respective feed-ins 162, 163, and 164 to a further input of the three mixers. In each mixer 122, 123, and 124, the received radar signals are thus mixed with the respective instantaneous transmitted signals. This is the configuration of an FMCW radar system, as is preferred for the applications cited initially. The present invention is not, however, limited only to this radar principle, and can also be used for pulsed radar systems. The mixed-down received signals of the three mixers 122, 123, and 124 are available at outputs 152, 153, and 154 for further signal processing.

Five antenna lobes 181, 182, 183, 184, and 185 are depicted proceeding from the five antenna elements 101 to 105. According to a preferred embodiment of the present invention, the outer antenna lobes 181 and 185 are configured so that a front and/or lateral close-in region of the radar system is predominantly illuminated. This is particularly advantageous when a radar system according to the present invention is used in the context of an automatic clearance warning or clearance control system in a motor vehicle. A further advantageous embodiment of this exemplary embodiment is that the transmission and reception elements are arranged spatially with respect to one another in such a way that the totality of the reception elements 102, 103, and 104 of this arrangement is located centeredly with respect to the totality of the transmission elements 101, 102, 103, 104, and 105.

Figure 2:
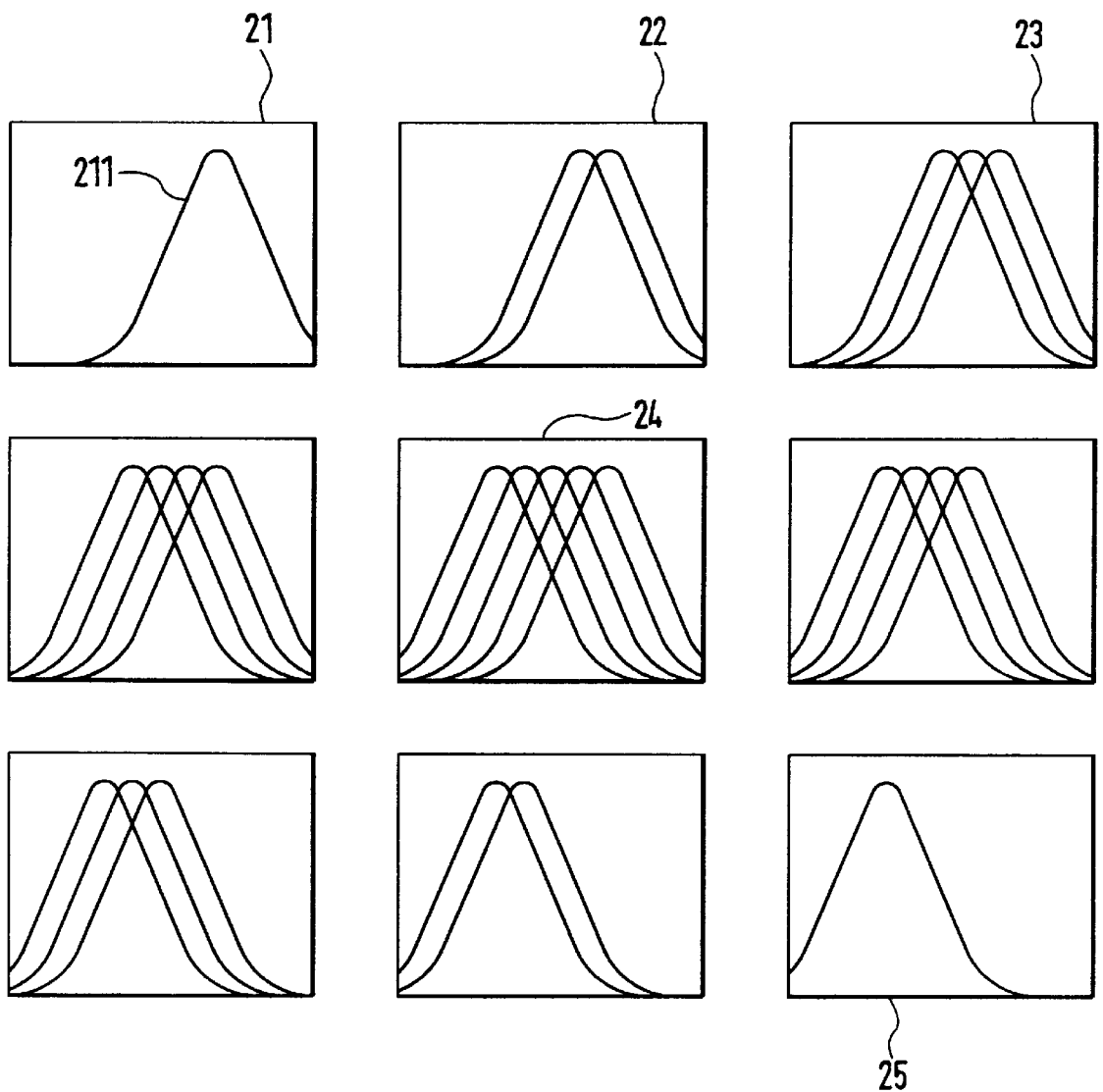
FIG. 2 shows possible radiation diagrams of a radar system according to the present invention, for transmission.

The manner in which the radar system according to the present invention operates will be illustrated below with reference to FIGS. 2 and 3. FIG. 2 shows nine selected transmission configurations, depicted schematically with reference to antenna diagrams, of a radar system according to the present invention. In this theoretical depiction, and in contrast to the antenna lobes in FIG. 1, the radiation characteristics of all the transmission elements are assumed to be identical. In configuration 21, a schematic antenna diagram 211 shows that in this configuration, transmission occurs only via one outer antenna element 105. In configuration 22, as an example, transmission occurs via two adjacent outer antenna elements 104 and 105. In configuration 23, transmission occurs via the three transmission elements 103, 104, and 105. In configuration 24, transmission occurs via all the antenna elements 101 to 105 that are present. In configuration 25, on the other hand, transmission once again occurs via only one antenna element, which in this case corresponds to antenna element 101 of FIG. 1. The further configurations depicted in FIG. 2 show some of the totality of all possible combinations of transmission elements.

Figure 3:
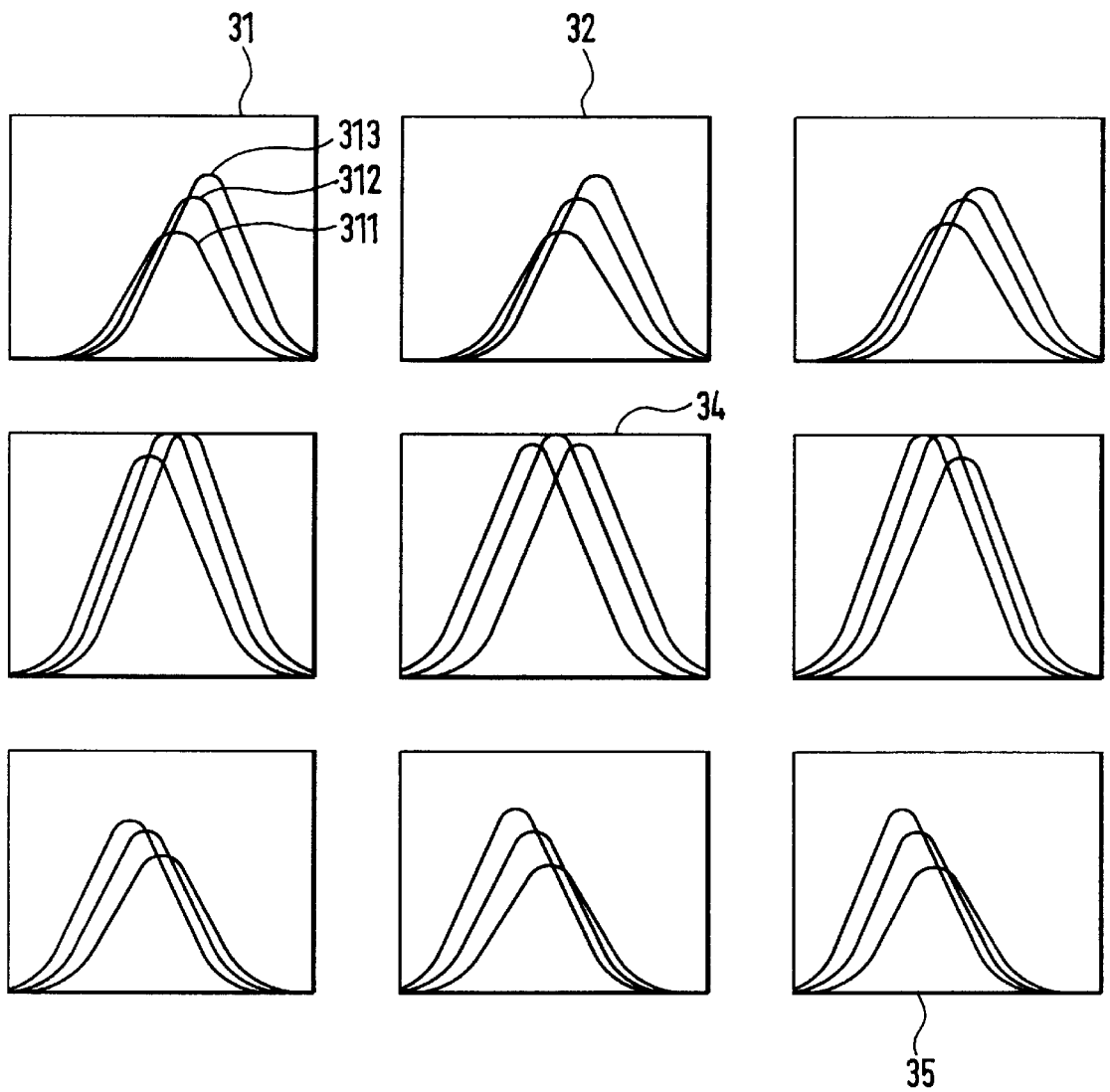
FIG. 3 shows possible effective antenna diagrams of a radar system according to the present invention.

FIG. 3 shows, in schematic fashion, effective antenna characteristics which result from a superimposition of the radiation characteristics of the transmission configurations as shown in FIG. 2 and the reception characteristics of the reception elements of a radar system according to the present invention as shown in FIG. 1. Effective antenna characteristic 31 results, for example, when a radar system according to the present invention and corresponding to FIG. 1 is operated in transmission configuration 21. Three curves 311, 312, and 313 of antenna diagrams, belonging to the three reception elements 102, 103, and 104, are evident. Curves 311, 312, and 313 have maxima of different heights, curve 311 possessing the lowest and curve 313 the highest maximum. Curve 313 belongs to reception element 104 located farthest to the right, curve 312 to reception element 103, and curve 311 to left-hand reception element 102. The different heights of the maxima result from the fact that, corresponding to transmission configuration, the right side of the angular region to be observed is predominantly illuminated. Reflected radar signals accordingly have a highest signal level at right-hand reception element 104, and a lower signal level at left-hand receiving element 102. The effective antenna characteristic of the radar system according to the present invention is, expressed visually, slewed slightly to the right for a transmission configuration 21.

The different heights of the maxima and, associated therewith, the different signal levels of the received signals of detected radar targets, have a particularly advantageous effect when analyzing the angle of detected radar targets. For example, unpublished German Patent Application No. 195 43 813.2 describes an angular analysis system in which the received radar signals from three antenna lobes are analyzed in terms of their respective signal amplitudes. This analysis becomes increasingly difficult at greater angles, since the amplitude differences to be analyzed in the edge regions of the antenna lobes become increasingly smaller. Because of the slewing of the effective antenna characteristic, the differences in the signal levels of received radar signals are advantageously increased. Alternatively or additionally, it is of course possible, in known fashion, to utilize the phase relationship of the reflected radar signals for angle determination.

Effective antenna characteristic 32 results with transmission configuration 22. In this case as well, the effective antenna characteristic is slewed to the right. This slewing is, however, weaker in this case than with antenna characteristic 31 explained previously. This results from the fact that in transmission configuration 22, transmission now additionally occurs via antenna element 104, which lies closer to the center than antenna element 105. In the case of effective antenna characteristic 34, it is evident that, overall, it is aligned symmetrically toward the front. This situation, which is preferably used for observation and analysis of a narrower angular region, is attained when, according to transmission configuration 24, transmission occurs simultaneously via all transmission elements 101 to 105. Effective antenna characteristic 35 is slewed to the left, opposite to characteristic 31. Angular analysis of detected radar targets is accomplished, for all transmission configurations and thus for all effective antenna characteristics, in accordance with the same known principle.

What is claimed is:

1. A multiple-beam radar system comprising:

a first number of transmission elements for transmitting radar waves;

a second number of reception elements for receiving reflected radar waves, the second number being less than the first number;

wherein an effective antenna characteristic of the system results from a superimposition of a transmission characteristic of at least one of the transmission elements and a reception characteristic of at least one of the reception elements, the effective antenna characteristic being modifiable for at least one measurement cycle by switching between the transmission and reception elements, wherein the transmission elements are activatable individually and simultaneously in a selectable combination.

2. The radar system according to claim 1, wherein the transmission elements and the reception elements are contained in a motor vehicle.

3. The radar system according to claim 1, wherein the reception elements are combined transmission and reception elements.

4. The radar system according to claim 1, wherein the transmission and reception elements are arranged with respect to one another such that a totality of the reception elements is located centeredly with respect to a totality of the transmission elements.

5. The radar system according to claim 4, wherein outer ones of the transmission elements have a radiation characteristic such that at least one of a front region and a lateral region of the system is substantially illuminated.

6. The radar system according to claim 1, wherein received signals of the reception elements are mixed via separate reception mixers.

7. The radar system according to claim 1, further comprising means for analyzing an angular position of a detected radar target as a function of at least one of an amplitude comparison and a phase comparison of received signals of at least two of the reception elements.

8. The radar system according to claim 1, wherein the transmission elements and the reception elements are disposed adjacent to each other.

9. The radar system according to claim 3, wherein the transmission elements are transmission-only elements.

10. The radar system according to claim 1, wherein the transmission elements and the reception elements are arranged within a housing.

11. The radar system according to claim 1, further comprising a focusing element arranged adjacent to the transmission elements and the reception elements.

12. The radar system according to claim 11, wherein the focusing element includes a dielectric lens.

* * * * *